United States Patent [19]
Mollura

[11] 4,321,719
[45] Mar. 30, 1982

[54] WATER MATTRESS WITH DAMPER BLADDERS

[76] Inventor: Carlos A. Mollura, 2824 Del Oro Pl., Fullerton, Calif. 92635

[21] Appl. No.: 165,983

[22] Filed: Jul. 7, 1980

Related U.S. Application Data

[60] Continuation of Ser. No. 42,098, May 24, 1979, abandoned, which is a division of Ser. No. 894,427, Apr. 7, 1978, Pat. No. 4,167,432.

[51] Int. Cl.³ .............................................. A47C 27/08
[52] U.S. Cl. .......................................... 5/451; 5/458; 156/309.6
[58] Field of Search ................... 5/451, 455, 456, 458; 297/DIG. 8; 156/290, 309.6

[56] References Cited

U.S. PATENT DOCUMENTS

| 4,172,301 | 10/1979 | Everard et al. | 5/456 |
| 4,204,289 | 5/1980 | Fogal | 5/451 |

*Primary Examiner*—Alexander Grosz
*Attorney, Agent, or Firm*—Fred Flam; Patrick F. Bright

[57] ABSTRACT

In a water mattress, a series of interior bags or bladders are individually attached to the top and bottom layers in order to damp the movement of water. Each bag or bladder comprises a pair of disks or layers peripherally heat sealed together. Each of the layers of each of the bags or bladders are welded to the respective layers of the waterbed mattress, there being indentations on the inside of the bag or bladder layers, the outside of the mattress layers being substantially free of indentations, there being a bead formed between the welded layers which bead is extruded primarily from the bag or bladder layers.

2 Claims, 8 Drawing Figures

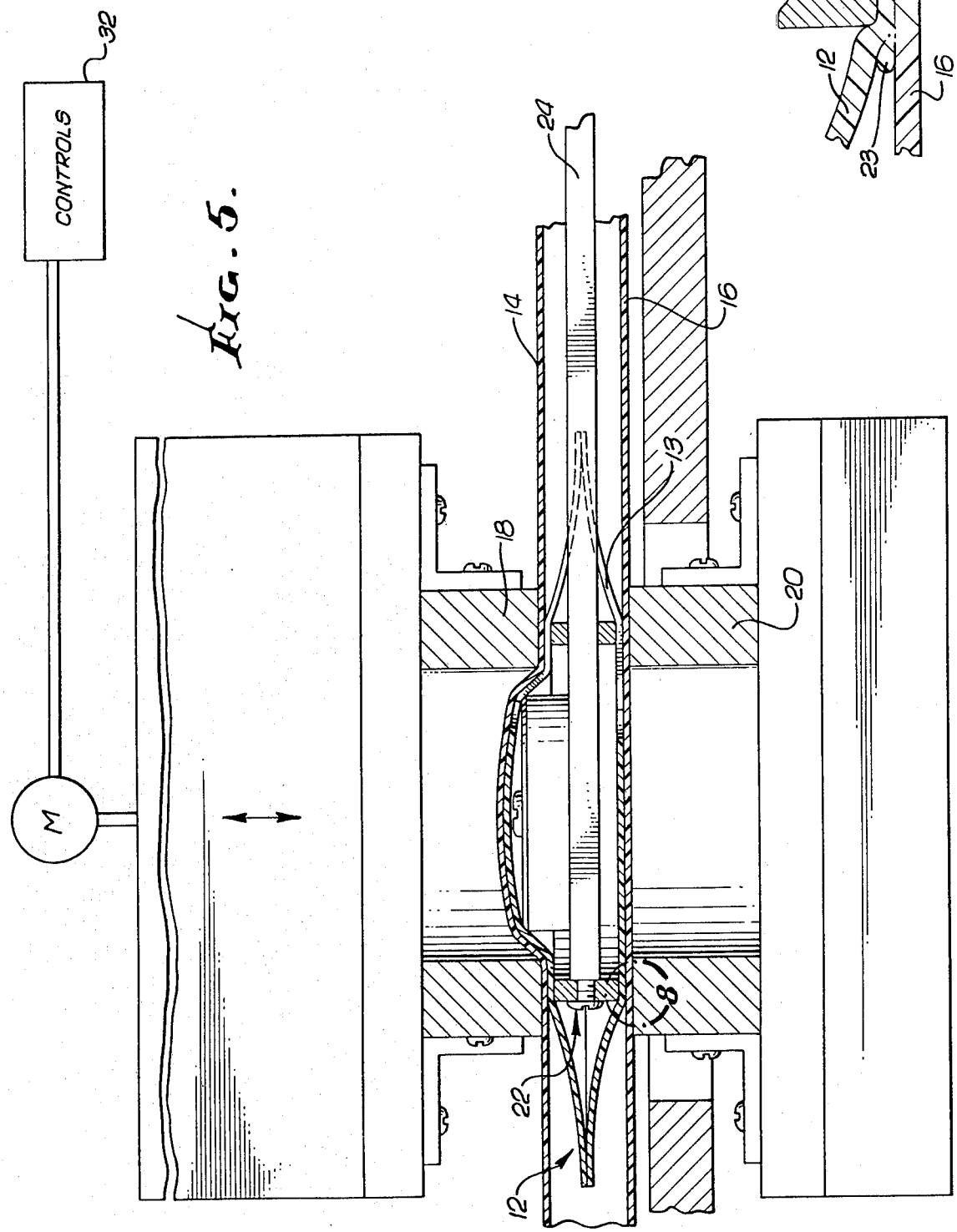

WATER MATTRESS WITH DAMPER BLADDERS

This application is a continuation of application Ser. No. 42,098, filed 5/24/79, now abandoned, which is a division of Ser. No. 894,427, filed 4/7/78, now U.S. Pat. No. 4,167,432.

FIELD OF INVENTION

This invention relates to water mattresses, utilizing a series of interior baffle bags or bladders of the type shown and described in co-pending application Ser. No. 865,995 of Lloyd Everard and Carlos A. Mollura filed Dec. 30, 1977 entitled FLUID FILLED BEDS AND THE LIKE, now U.S. Pat. No. 4,172,301. More particularly, this invention relates to a method of attaching the baffle bladders in such a manner as to minimize the possibility of leakage and failure.

BACKGROUND OF THE INVENTION

Waterbed mattresses of the most elemental form comprise two juxtaposed layers of plastic material with the edges directly or indirectly sealed together to form a bag. It has been proposed to provide internal baffle structures for the purpose of damping wave motions that occur when the weight load on the mattress is other than at rest.

One of the most successful structures is one that utilizes a series of individual bladders attached to the top and bottom mattress layers or walls. Each bladder is made of a pair of sheet plastic disks peripherally welded together. The disks are centrally attached to the respective mattress plies at places located inwardly of the periphery. When the mattress is filled with fluid, the disks of the bladder separate and the bladder assumes a generally biconical form. The bladder is open, as by a radial slit, to allow free passage of water into and out of the bladder. The resisted movement of water into and out of the bladder has a damping effect. Moreover, the bladders themselves form baffles in the mattress to assist the damping function. Such a structure is shown and described in said above-identified patent application. FIGS. 1 and 2 herein show such prior art mattress.

DISCUSSION OF THE PRIOR ART

The prior art mattress shown in FIGS. 1 and 2 comprises top and bottom sheets or layers of plastic material and a series of individual bags or bladders B attached to the top and bottom layers. The preassembled bladders comprise two disks peripherally sealed together and slotted radially in order to open them. The bladders are attached serially row by row. Finally, the top and bottom sheets of plastic material are welded together. The respective disks of each bladder are heat welded to the top and bottom mattress layers by operation of a dielectric or induction press. A removable separator S is interposed between the bladder disks before the press closes to prevent the disks from being welded to each other. This method by which the bag bladder is heat welded tends to thin, deform and thus weaken the top and bottom layers because these layers are next to the ring dies D while the layers of the bags or bladders are broadly supported by the flat separator S. An annular indentation I is formed. The weld will first tear at the thinnest region, which is at the edge of the indentation I.

Broadening the area of the ring die does not in any way minimize the problem. More material would be required to flow past the edges of the die, and the indentation at the edges would still be the same if a weld is achieved. Additionally, excessive flashing would be produced.

The primary object of this invention is to provide a simple method of heat welding bags or bladders to the top and bottom layers of the plastic mattress without significantly distorting the mattress layers whereby the danger of failure and leakage is minimized, and without requiring any additional manufacturing steps.

SUMMARY OF THE INVENTION

In order to accomplish the foregoing object, I weld from the inside of the bags or bladders rather than from the outside of the mattress. For this purpose, I provide a pair of platens or heads of very broad area for contact with the mattress layers. Localized heat is provided by an internal floating ring die of electrically conductive material that is inserted into the bag or bladder. The ring die forms two dielectric capacitor elements in series, one at the top of the mattress and one at the bottom. The plastic material that is primarily thinned and distorted during the heat welding is the layer in contact with the ring die, namely, the bag bladder itself at its inside surfaces. Any tear of the bladder will not result in leakage. A slight tear will not affect its operation, since the bag or bladder by design is open or unsealed.

BRIEF DESCRIPTION OF THE DRAWINGS

A detailed description of the invention will be made with reference to the accompanying drawings wherein like numerals designate corresponding parts in the several figures. These drawings, unless described as diagrammatic or unless otherwise indicated, are to scale.

FIG. 5 is an enlarged fragmentary view, partly in section, illustrating the individual bladders just prior to heat welding to the top and bottom mattress layers.

FIG. 8 is a greatly enlarged sectional view taken from the area 8 of FIG. 5 and illustrating the bladder as actually welded to the mattress layers, the bead being typical and not necessarily exactly representative of all structures.

DETAILED DESCRIPTION OF PREFERRED EMBODIMENT

The following detailed description is the best presently contemplated mode of carrying out the invention. This description is not to be taken in a limiting sense, but is made merely for purposes of illustrating the general principles of the invention since the scope of the invention is best defined by the appended claims.

Figure 1:
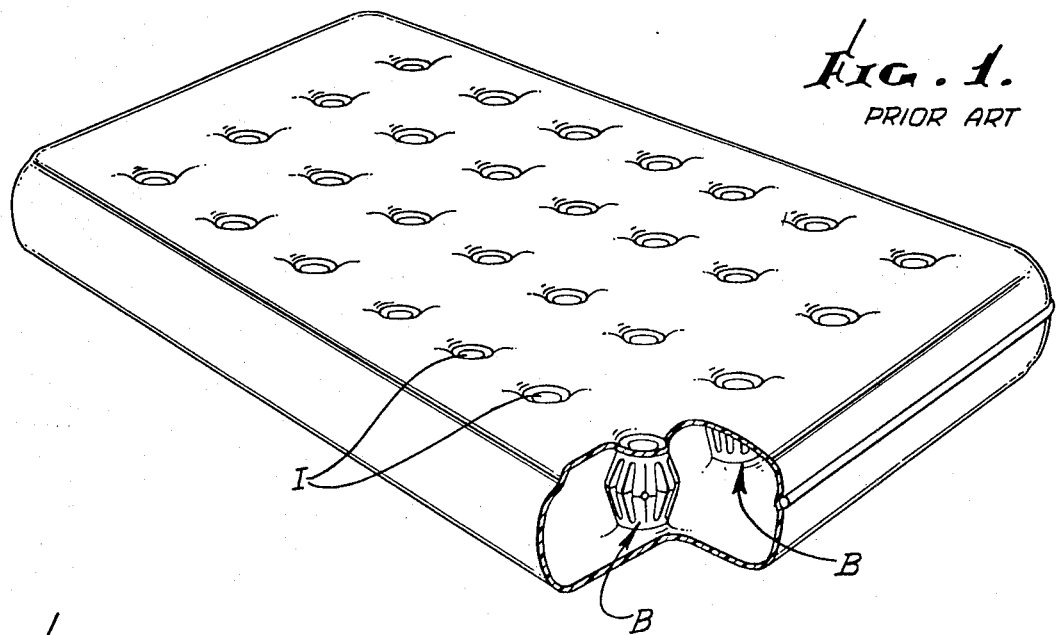
FIG. 1 is a perspective view, partly in section, of a prior art mattress.

The prior art waterbed mattress shown in FIG. 1 includes top and bottom sheets of heat weldable thermoplastic material such as commonly used in the industry. The top and bottom plastic sheets are attached throughout the operative area by an array of open bladders B. The bladders B serve to baffle the water in the mattress so that wave motions are damped. Additionally, each bladder B serves a shock absorbing function due to the fact that water contained in the bladder is expelled with some resistance upon the imposition of pressure. Pressure is imposed, for example, by the placement of the weight of a person on the mattress. When the mattress is allowed to return to its normal state, the bladders expand as the level of water in the mattress equalizes and draws water back inside.

Figure 4:
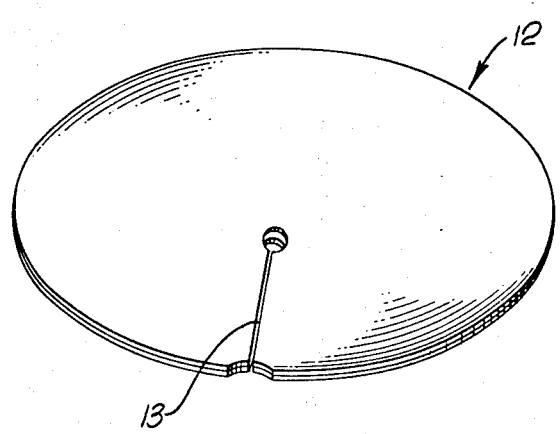
FIG. 4 is a perspective view of a preassembled "pancake" bag or bladder.

The prior art bladders B shown are a "pancake" form, comprised of two disks of plastic material peripherally welded together as shown in FIG. 4. The bladders are serially secured to the top and bottom plastic layers. Ultimately, the mattress is closed and a filler valve assembly (not shown) is installed.

Figure 2:
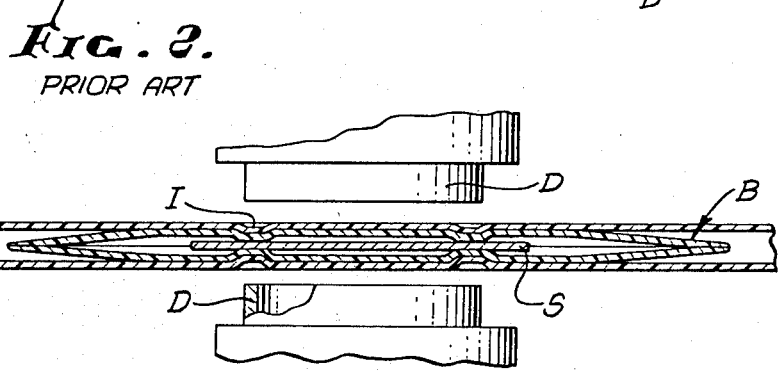
FIG. 2 is an enlarged fragmentary view, partly in section, illustrating diagrammatically the prior art method by which the individual bladders are heat welded to opposed top and bottom layers of the mattress.

FIG. 2 illustrates the prior art method of attaching each bladder. The bladder B in a flat state is positioned between the mattress layers with a thermal separator S inside the bladder. Companion ring dies D close about the four layers and separator S. Heat generated dielectrically or otherwise at the narrow ring causes the bladder layers to weld respectively to the mattress layers. Indentations I are formed in the mattress layers which are thinned by the process. Since there are numerous bladders B in the completed mattress, there are correspondingly numerous localized stress regions. Even if the mattress is made without any initial imperfection, aging of the plastic and fatique may develop a failure.

Figure 3:
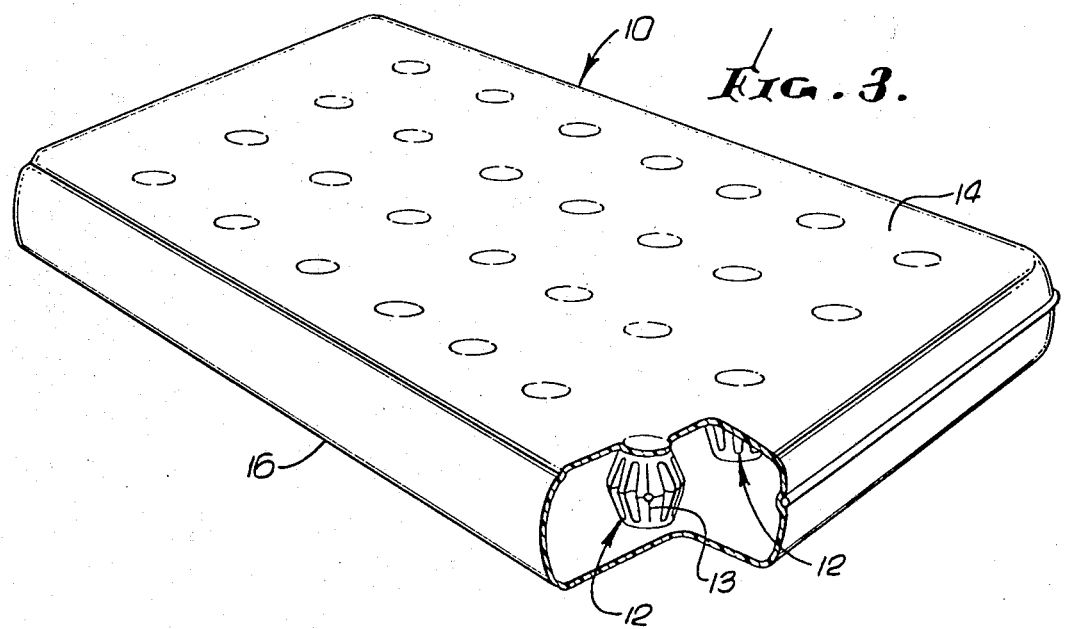
FIG. 3 is a perspective view, partly in section, of a mattress made in accordance with the present invention.

In the improved mattress 10 of FIG. 3, no thinning of the mattress layers occurs and no actual indentations are formed, although numerous bladders 12 are interiorly attached. The bladders 12 are, in fact, identical to the bladders B of the prior art form and as shown in FIG. 4. The bladders have radial slits 13 for slightly resisted flow of the fluid and for purposes hereinafter described. The manner in which the bladders 12 are individually attached eliminate indentations in the mattress layers.

FIG. 5 shows one bladder being attached. The bladder 12 is positioned in its substantially flat state between the mattress layers 14 and 16. The four plastic layers are positioned between plates or heads 18 and 20 that have relatively thick or broad walls so as to provide a large flat circular contact area. The heads 18 and 20 are mounted on opposed elements of a dielectric welding machine for movement toward and away from each other. High frequency electrical potential applied to the plates results in an electrical current between them in accordance with the size of the impedance of the electrical capacity between the plates. Instead of a thermal separator, a floating ring die 22 of electrically conductive material is inserted into the bladder through its slits 13. The wall of ring die 22 is relatively narrow. The ring die forms, at opposite ends, plates of capacitors with the corresponding plates or heads 18 and 20. Thus, there are, in effect, two capacitors in series, one at the top and one at the bottom, each with two layers of plastic as the dielectric. Dielectric heating takes place at the plastic or dielectric between the capacitor plates, all in a well understood manner.

The extrusion of plastic incident to welding takes place primarily on the inside, not the outside. See FIG. 8. As shown in FIG. 8, the bag 12 is thinned, not the mattress layer 16. An indentation 21 is formed in the bag 12 by the die 22. The heated layers fuse into one while the extruded material forms a bead 23, primarily from the bag layer. The thinnest part of the welded structure runs from the corner of the bead to the place corresponding to the corner of the ring die 22. If any tearing occurs it occurs there. The indentation 21 is formed in the bladder disks, not on the outside of the mattress. Thinning takes place in the bladder, not the mattress. The mattress layers suffer only slight fluid movement and are not thinned or weakened by the welding process. The bladder still continues its intended functions even if a slight tear or failure occurs at the weld. The bladder is not intended to be sealed in any event. In fact, the bladder is designed to be open to provide the damping effect heretofore described.

Figure 6:
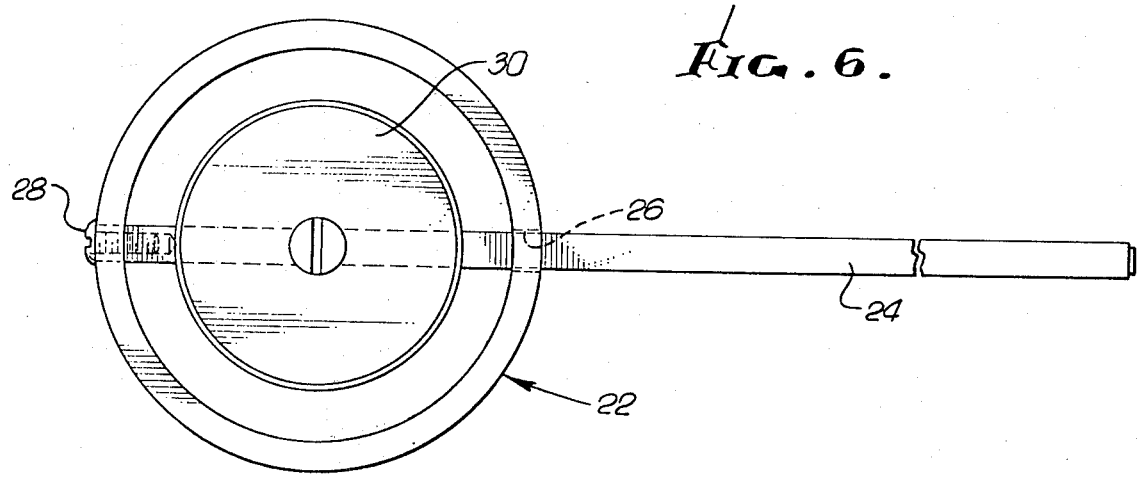
FIGS. 6 and 7 are end and top plan views of the floating die ring used in the welding step shown in FIG. 5.
Figure 7:
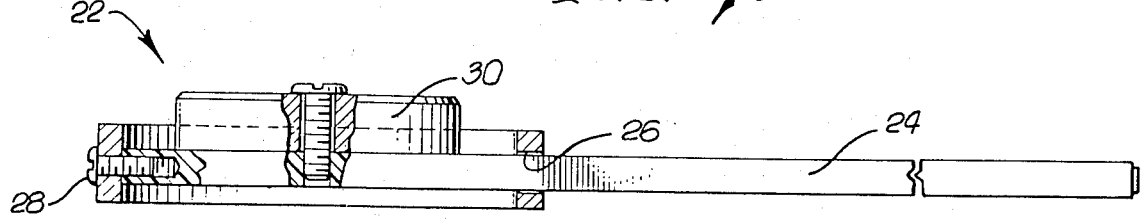

The floating ring die 22 is mounted on a plastic insulation handle 24. The end of the handle 24 extends diametrically across the die 22 as shown in FIG. 7. The handle lies entirely between the top and bottom bounding planes of the die 22 so as to allow the machine to close without interference. For this purpose, the handle 24 projects through a hole 26 (FIG. 6) at one side of the floating die 22 to the opposite side where it is fastened by a screw 28 (FIG. 7). The handle 24 carries a locator disk 30 of plastic material designed to register with one of the heads 18 and 20 to ensure substantial alignment of the floating ring die with the heads 18 and 20.

The configuration of the ring die is not critical. It need not be circular or annular. If the bags or bladders are oval rather than circular, the die may be of a bar or flattened loop configuration.

After all the bladders are properly welded to the mattress, the top and bottom mattress layers are peripherally sealed.

Details of the welding machine are not shown since they are conventional and well known. The machine is provided with suitable controls 32 to determine the heat applied, as by control of current and closure time, and to determine the closure pressure exerted by the die structure.

Intending to claim all novel, useful and unobvious features shown or described, I make the following claims:

1. In a waterbed mattress:
    (a) a pair of layers forming the top and bottom of a waterbed mattress;
    (b) a series of individual bags or bladders arrayed in spaced relationship inside the mattress for damping wave motion therein, said bags or bladders being substantially uniformly distributed throughout the operative mattress area;
    (c) each bag or bladder comprising a pair of juxtaposed plastic layers peripherally welded together; and
    (d) each of the layers of each of the bags or bladders being welded to the respective layers of the waterbed mattress, there being indentations on the inside of the bag or bladder layers, the outside of the mattress layers being substantially free of indentations, there being a bead formed between the welded layers which bead is extruded primarily from the bag or bladder layers.

2. In a waterbed mattress:
    (a) a pair of layers forming the top and bottom of a waterbed mattress;
    (b) a series of individual bags or bladders arrayed in spaced relationship inside the mattress for damping wave motion therein, said bags or bladders being substantially uniformly distributed throughout the operative mattress area;

(c) each bag or bladder comprising a pair of juxtaposed plastic layers peripherally welded together; and (d) the upper layer of each of the bags or bladders being welded to the top of the waterbed mattress, there being indentations on the inside of the bag or bladder layers, the outside of the mattress layers being substantially free of indentations, there being a bead formed between the welded layers which bead is extruded primarly from the bag or bladder layers.

* * * * *